United States Patent [19]

Klein

[11] 4,166,172

[45] Aug. 28, 1979

[54] PRODUCTION OF POLYETHER POLYOL COMPOSITIONS

[75] Inventor: Howard P. Klein, Austin, Tex.

[73] Assignee: Texas Development Corporation, White Plains, N.Y.

[21] Appl. No.: 751,770

[22] Filed: Dec. 16, 1976

Related U.S. Application Data

[63] Continuation-in-part of Ser. No. 560,175, Mar. 20, 1975, abandoned.

[51] Int. Cl.$^2$ ................... C07H 15/08; C07C 41/00
[52] U.S. Cl. ........................ 536/4; 568/620; 521/174; 536/1; 536/120
[58] Field of Search .................... 536/1, 4, 120; 260/615 B

[56] References Cited

U.S. PATENT DOCUMENTS

| | | | |
|---|---|---|---|
| 3,317,508 | 5/1967 | Winquist et al. | 536/1 |
| 3,332,934 | 7/1967 | Booth et al. | 536/4 |
| 3,346,557 | 10/1967 | Patton, Jr. et al. | 536/120 |
| 3,357,970 | 12/1967 | Ulyatt | 536/4 |
| 3,391,196 | 7/1968 | Earing et al. | 260/615 |
| 3,445,525 | 5/1969 | Bormann et al. | 260/615 |
| 3,748,201 | 7/1973 | Jordan | 536/120 |

Primary Examiner—Johnnie R. Brown
Attorney, Agent, or Firm—Carl G. Ries; Thomas H. Whaley; Kenneth R. Priem

[57] ABSTRACT

An improved method for the production of polyether polyol compositions is disclosed wherein a polyhydric initiator is oxyalkylated with alkylene epoxides at lower temperatures in the presence of an aqueous ammonia solution. The polyether polyol compositions produced have desirable hydroxyl numbers and low viscosities and are particularly useful in the production of excellent rigid polyurethane foams. In addition to catalyzing the reaction, the nitrogen containing moiety itself undergoes oxyalkylation during the process such that the polyether polyol compositions produced contain, admixed therewith, various alkoxyalkanol amines. The alkoxyalkanol amines having reactive hydroxyl groups and acting as a mild catalyst for the polyolisocyanate reaction need not be removed from the polyether polyol composition. In addition, the alkoxyalkanol amines increase the blending compatibility of the polyether polyol compositions.

8 Claims, No Drawings

PRODUCTION OF POLYETHER POLYOL COMPOSITIONS

CROSS REFERENCE TO RELATED APPLICATIONS

This application is a continuation-in-part of application, Ser. No. 560,175 filed Mar. 20, 1975, now abandoned.

BACKGROUND OF THE INVENTION

This invention relates to the production of polyether polyol compositions; and more particularly to a method of producing polyether polyol compositions which contain alkoxyalkanol amines by oxyalkylating a polyhydric initiator in the presence of an aqueous ammonia solution.

PRIOR ART

Polyoxyalkylene polyols or polyether polyols are well known. Such polyether polyols are known to be formed by the reaction of a polyhydric compound having from about 2 to 8 hydroxyl groups with a 1,2-epoxide such as ethylene oxide, propylene oxide or higher alkylene oxide in the presence of a basic catalyst such as aqueous sodium or potassium hydroxide. The polyether polyols produced are useful as reactants with isocyanate containing compounds to form polyurethane material and particularly polyurethane foams.

The above-mentioned method of producing polyether polyols is less than desirable, however, in that the reaction requires a subsequent refining step which includes the neutralization of the caustic alkali catalyst with subsequent removal of the precipitated salts. In addition, the presence of aqueous caustic alkali in the reaction medium is known to facilitate undesirable side reactions. Specifically, the alkylene oxide and water combine to produce diols. These diols tend to decrease the functionality of more desirable higher functionality polyol compositions.

In an effort to avoid the subsequent refinement step and/or the production of diols, various methods have been proposed. For example, oxyalkylation of the relatively high melting polyhydric initiators has been proposed where the solid initiators are fused at high temperatures in the presence of an alkylene oxide. This method, while avoiding the disadvantages of the previous method, damages and discolors the final product because of the high temperatures required. Other proposed methods involve the use of nonaqueous solvents with a compatible basic substance; however, most of these methods require catalyst removal and/or solvent recovery prior to using the produced polyols in polyurethane foams. For example, it has been disclosed that certain amine compounds can be utilized as both a solvent and a catalyst for polyether polyol production. One process, as disclosed in U.S. Pat. No. 2,902,476, uses lower alkyl tertiary amines and, specifically triethyl-, trimethyl- and tripropylamines, as a solvent and a catalyst in the reaction of propylene oxide with polyhydric initiators. Water is specifically excluded from the reaction mixture.

While this process eliminates the inherent difficulties encountered with aqueous reaction mediums, it involves the use of expensive, purified solvents. Additionally, trialkyl amines are poor initiator solvents. Thus, large amounts of amine solvent are required in order to form the desirable single phase reaction mixture. The presence of large quantities of trialkyl amines in the polyol product is not desirable. Specifically, such substances are highly odoriferous in urethane foam products and strongly catalyze isocyanate-polyol reactions. Therefore, small amounts of these substances must be utilized and/or the solvent must be removed from the polyether polyol composition prior to foam formation, thus requiring a removal step. When small amounts of tertiary alkyl amines are utilized, the amount of solvent is insufficient to form a homogeneous single-phase reaction media. The resulting solid-liquid-gas heterogeneous reaction is difficult to adequately control.

Another such process disclosed in U.S. Pat. No. 3,332,934, utilizes a triethanolamine catalyst-solvent for the reaction of propylene oxide with a polyhydric initiator. As in the previously disclosed process, the reaction proceeds in the absence of water. Pure triethanolamine like trimethylamine is relatively expensive. Likewise, triethanolamine is a poor initiator solvent. When those amounts of triethanolamine required to produce polyols of desirable hydroxyl number, i.e. from about 400 to 600, are utilized, a heterogeneous slurry of the solid polyhydric material is formed. Thus the oxyalkylation occurs in a gas-liquid-solid phase reaction. As mentioned hereinbefore, such a system is difficult to control with the rate being determined by the solubility of the solid initiator. The time of reaction ranges from 7 to about 20 hours. If larger amounts of triethanolamine are utilized, a reformulation of the catalyzed polyol-isocyanate foam reaction is required.

Further, some of the polyether polyols produced using pure triethanolamines exhibit viscosities which render them difficult to ship and use in standard urethane systems. Attempts to use solvents, such as for example a fluorocarbon, in order to reduce viscosities limits the use of the polyether polyols in producing low density foam compositions. Therefore, a process for producing polyether polyols, which is compatible with urethane systems, is relatively easy to control, uses relatively inexpensive starting materials but does not suffer the inherent drawbacks of caustic alkali catalyzed systems, would be desirable.

Unexpectedly it has been found that suitable polyether polyols, including those having hydroxyl numbers from about 400 to about 650 with viscosities from about 1,000 to 20,000 centipoise, can be produced in a single process utilizing the relatively inexpensive starting materials of aqueous ammonia, and one or more alkylene oxides with a polyhydric initiator. The reactions proceed relatively fast in a homogeneous reaction media at lower temperatures. The ammonia itself becomes oxyalkylated producing alkoxyalkanol amines which are compatible with urethane systems and need not be removed prior to the polyol-isocyanate reaction. These alkoxyalkanol amines increase the blending compatibility of the polyol compositions with other polyols. Surprisingly, the production of diols is relatively small and no refinement step is necessary to remove the nitrogen containing moiety. Further, it has been unexpectedly found that by varying the amounts (concentration) of the ammonia initially added, the viscosities of the polyether polyols produced can be effectively lowered without materially affecting properties of the foam produced therefrom.

SUMMARY OF THE INVENTION

According to the broader aspects of the invention, polyether polyols are produced by oxyalkylating a polyhydric initiator at lower temperatures with an alkylene oxide in the presence of an effective amount of an aqueous ammonia solution. The nitrogen containing moiety also undergoes oxyalkylation during the process such that the final polyether polyol contains admixed therewith various alkoxyalkanol amines which contain reactive hydroxyl groups and act as a mild catalyst for polyol-isocyanate reactions.

According to a preferred embodiment, polyether polyols having low hydroxyl numbers and low viscosities are prepared by forming an aqueous initiator-ammonia mixture which is heated to temperature of about 40° C. The heated mixture is intimately contacted with an alkylene oxide selected from ethylene oxide, and propylene oxide and mixtures thereof at temperatures of from about 40° C. to 120° C. to produce the polyether polyol composition.

DETAILED DESCRIPTION OF THE PREFERRED EMBODIMENT

Polyether polyol compositions having hydroxyl numbers from about 400 to about 650 with viscosities from about 4,000 to 20,000 centipoise are produced in accordance with a preferred embodiment by initially admixing sufficient water with a solid sucrose initiator to form a homogeneous aqueous solution containing from about a 50% to about 75% by weight sucrose. The aqueous solution thus formed is then heated to from about 30° C. to about 40° C. in a suitable reaction vessel such as a sealable reaction kettle fitted with agitation apparatus or the like. The temperature of the solution is maintained while the solution is agitated in an inert atmosphere, e.g. nitrogen. Ammonia gas is then pressured into the kettle at autogenous pressure until an aqueous ammonia-sucrose solution is obtained containing from about 10 to 100 parts by weight sucrose to 1 part by weight ammonia. While agitation is continued, ethylene oxide is slowly pressured into the reaction kettle at autogenous pressures. The temperature of the exothermic reaction mixture is regulated between about 50° and 65° C. during ethylene oxide addition by the removal of heat using suitable means such as for example a water cooled condenser or the like. The ethylene oxide addition is continued until from about 2 to 12 moles of ethylene oxide is added per mole of sucrose. The ethylene oxide is allowed to digest until a substantially constant pressure is attained.

The excess oxide is vented and excess water removed by, for example, vacuum stripping to yield a reaction mixture having from about 8% to 12% by weight water.

The reaction mixture is then heated by suitable means to temperatures of from about 100° C. to about 115° C. Propylene oxide is then slowly pressured into the reaction kettle at autogenous pressure in amounts from 8 moles to 20 moles per mole of sucrose. The propylene oxide is allowed to digest until a substantially constant pressure is attained to yield a polyether polyol in accordance with the instant invention.

If desired, formed glycols and additional water can then be removed by, for example, steam stripping followed by vacuum stripping accomplished by methods well known in the art.

In the broadest sense, the polyether polyols of the instant invention are the oxyalkylation product of an alkylene oxide and an initiator having from about 2 to 8 hydroxyl moieties per molecule. The initiators useful in the practice of the invention can be characterized generally as non-aromatic polyhydric nonreducing compounds. These initiators are well known in the art, many being described in U.S. Pat. No. 3,535,307. A preferred class of initiators are those nonreducing polyhydric compounds having from 3 to 8 hydroxyl groups. The preferred initiators are sucrose, sorbitol, α-methyl glucoside, hydroxypropyl glucoside, pentaerythritol, trimethylolpropane, and glycerine. The most preferred is sucrose because of availability.

The oxyalkylating agents useful in the practice of the instant invention may be generally characterized as the alkylene oxides. A preferred group of alkylene oxides are those having from about 2 to about 4 carbon atoms and more preferably the 1,2-epoxides having 2 to 3 carbon atoms, i.e. ethylene oxide and propylene oxide.

The oxyalkylated product, i.e. the polyether polyols of the instant invention, are achieved by the utilization of specific alkylene oxides or mixtures thereof in various quantities. While the hydroxyl number and viscosities of the final polyol products are determined by various factors such as temperature and the amount of ammonia present, to a large extent the characteristics of the final polyol are determined by the oxyalkylating agents, their manner of addition to the reaction media, and the quantities used. The alkylene oxide addition is therefore somewhat empirical and depends upon factors such as the product desired, the alkylene oxides used, the method of addition, the order of addition and the temperatures at which the alkylene oxides are added. For example, the alkylene oxide reagent can be added to the reaction mixture in either a heteric or a blocked manner or a combination thereof.

In order to achieve the most desired polyols of the instant invention, it is preferred that a blocked addition be utilized wherein ethylene oxide is first added to the reaction mixture and then propylene oxide is added. Various addition methods yield products of the desired viscosity range with desirable hydroxyl numbers. For example, heteric-type addition can be used wherein a mixture of ethylene oxide and propylene oxide is added. Further, the relative concentrations of ethylene oxide and propylene oxide may be varied in the mixture as the reaction progresses. For example, an ethylene oxide rich mixture may be initially metered into the reaction mixture. As the addition progresses, the relative concentration of propylene oxide may be increased. This can be accomplished with, for example, a valved mixing nozzle which is progressively regulated.

According to the invention, the reaction mixture contains aqueous ammonia which may be supplied by any ammonia releasing or ammonium hydroxide forming substance which is nondeleterious to the reaction. The concentration of ammonia present in the aqueous ammonia-initiator solution is preferably from about 1:10 to 1:100 parts by weight of ammonia to initiator and more preferably 1:10 to 1:30. All the ammonia present in aqueous solution is believed to be present as the hydroxide. Preferably ammonia gas is used, being brought into intimate contact with an aqueous initiator solution. Ammonium hydroxide can also be employed either alone or in combination with the ammonia gas. When ammonium hydroxide is used, preferably a 29% ammonia by weight aqueous solution is employed. It will be understood that the initial water added to the coinitiator can be reduced proportionally to allow for the water added when aqueous ammonium hydroxide is employed.

The exact amount of water used in forming the initial reaction mixture is not critical. A sufficient amount of water is necessary to dissolve the solid initiator and expedite the reaction. Since the majority of the water is removed from polyether polyols used in nonaqueous urethane systems, polyols prepared for use in such systems advantageously contain only small amounts of water. Excess water occurring in the final polyether polyol products produced may be removed by any suitable method known in the art such as vacuum stripping.

According to the process of the instant invention, an initial reaction mixture is formed wherein an initiator is admixed with water and an ammonia releasing substance or ammonium hydroxide. Preferably, the initiator is first admixed with water to form a homogeneous solution to which ammonia is added. The most preferred aqueous initiator solutions are those obtained in commerce which are already in liquid form. These solutions facilitate pumping of the initiator into the reaction vessel without the need for handling solid initiator such as sucrose or the like. Anhydrous ammonia is contacted directly with the aqueous initiator solution. The aqueous initiator-ammonia solutions are thus prepared by pressuring ammonia gas into the initiator solution at autogenous pressures preferably in the presence of an inert atmosphere until a desired concentration is obtained.

Preferably, the aqueous sucrose solution is initially preheated to temperatures of from about 30° C. to 40° C. to facilitate the addition of the ammonia and to further dissolve the initiator when a solid initiator is used. The preheating step is desirable in that it decreases the amount of water required to form a substantially single phase aqueous ammonia-initiator mixture and helps insure a homogeneous reaction mixture. During this preheating, an inert atmosphere is maintained within the reaction kettle. Preferably this is accomplished by the introduction of anhydrous nitrogen; however, any inert gas commonly used for such purposes may be utilized. The inert atmosphere is not critical and is employed to prevent formation of color forming impurities which detract from the appeal of the urethane foam ultimately produced from the polyether polyols formed.

The oxyalkylation can be accomplished immediately upon formation of the initial reaction mixture. The alkylene oxide is pressured in the reaction kettle and allowed to come in intimate contact with the reaction mixture. Generally, oxyalkylation is an exothermic reaction. Depending on the alkylene oxide used, the heat of reaction must be dissipated from the reaction mixture or the rate of addition regulated to maintain the reaction mixture temperature below about 150° C. Temperatures in excess of 150° C. facilitate unwanted side reactions which result in color forming impurities. In order to initiate the oxyalkylation reaction, the reaction mixture can be initially heated to a desirable temperature.

When block addition of more than one alkylene oxide is required, it has been found advantageous to carry out the oxyalkylation step in stages. Thus, reaction temperatures may be more effectively controlled to facilitate formation of particular products, and the water content of the reaction mixture can be regulated at the termination of each stage.

As was mentioned hereinbefore, unexpectedly the instant process does not result in extensive diol formation, even though water is used as a solvent. The reason for this is not clearly understood but is believed to be associated with the weak basisity of the nitrogen containing moiety. As water is present in the reaction mixture, however, it will react to some extent with the oxides to produce glycols thus increasing the hydroxyl number of the final product. Therefore, by utilizing blocked addition techniques, excess water can be removed prior to addition of alkylene oxides requiring strenuous reaction conditions, such as for example high temperatures.

When the ethylene oxide and propylene oxide are added in a blocked manner, preferably ethylene oxide is added in amounts from about 2 moles to about 12 moles per mole of initiator and more preferably 3 moles to about 5 moles per mole of initiator. The amounts of propylene oxide which can be utilized are preferably from about 8 moles to about 20 moles per mole of initiator, and more preferably from about 12 moles to about 16 moles per mole of initiator. Preferably the ethylene oxide is added at lower temperatures of about 50° to 65° C. whereas the propylene oxide is added at slightly higher temperatures of from about 105° to 115° C. Additionally, to insure inhibition of diol formation, excess water is preferably removed at the termination of the ethylene oxide addition. Sufficient water is removed such that the reaction mixture contains from about 6% to about 12% water by weight and more preferably 10% water by weight. Surprisingly, it has been found that lowering the water concentration below about 6% does not decrease substantially the small amount of glycol formed, but does materially impede the completion of the alkylene oxide addition.

After each addition of alkylene oxide, preferably sufficient time is allowed to completely digest and react the added reagent. Upon completion of all alkylene oxide additions, the reaction vessel is vented. Excess water and/or glycol then may be removed by vacuum stripping or steam stripping the reaction product. The need for water and/or glycol removal at various stages during the production of the polyether polyols will depend upon the final product desired. According to a preferred embodiment wherein the ethylene oxide and propylene oxide are added in blocks, regulation of the reaction mixture water content after the ethylene oxide addition may render subsequent steam stripping to effect glycol removal unnecessary.

During the instant process, the nitrogen containing moiety, which is predominately ammonium hydroxide, undergoes oxyalkylation. The oxyalkylated nitrogen moiety, which can best be described as an alkoxyalkanolamine, is present in the final product. Thus, the polyether polyols of the instant invention contain, admixed therewith, various alkoxyalkanol amines which need not be removed prior to the polyol-isocyanate reaction. These amine compounds have been shown to contain hydroxyl moieties which undergo reaction to become an integral part of the polyurethane polymeric network. Additionally, these amine compounds act as a mild catalyst in the isocyanate reaction yielding highly desirable foams, but not interferring with the formulation of reactants. Specifically, it has been discovered that the amount of externally added catalyst normally required in foam formulation need not be varied when using the polyether polyols of the instant invention.

The equipment required for carrying out the process of the instant invention is well known in the art. The process can be carried out in a single standard gas-liquid phase reaction kettle preferably fitted with a stirring apparatus and a means for heating the reactants for temperatures of about 30° C. to about 120° C. Additionally, the reaction kettle need only maintain pressure integrity at pressures of from 1 to 6 atmospheres.

In accordance with another aspect of the invention, it has been unexpectedly found that the viscosity of the final polyether polyol produced in accordance with the invention can be varied within relative limits by varying the amount of ammonia originally present in the aqueous initiator-ammonia admixture. It will be realized that generally the viscosity increases as the hydroxyl number increases and this is generally true of the polyether polyols produced in accordance with the instant invention. However, it has been found that a relatively less viscous product may be formed by adding relatively more ammonia in the initial step of the process. For example, it has been shown that viscosities in the range from about 1,000 to about 8,000 centipoise can be obtained with polyether polyols produced in accordance with the invention having hydroxyl numbers from about 450 to about 600 by adding from about 1 to about 5 weight % excess ammonia based upon the weight of ammonia initially present in the aqueous initiator-ammonia solution. Generally, the amount of excess ammonia that can be added is that amount which will nondeleteriously affect the urethane foam produced from the polyether polyol produced in accordance with the instant invention.

In accordance with another aspect of the instant invention, a polyether polyol which is suitable for blending may be produced. Blending as used herein is physically admixing one or more polyether polyols having for example different hydroxyl numbers and viscosities to produce a polyether polyol admixture having a hydroxyl number and a viscosity within a desirable range for a specific application. Specifically, by forming an aqueous ammonia-initiator solution containing an excess of ammonia polyols having relatively lower viscosities can be produced. Further, by contacting the aqueous ammonia-initiator containing excess ammonia with relatively larger molar amounts of ethylene oxide at lower temperatures and relatively smaller amounts of propylene oxide at higher temperatures, polyether polyols having lower hydroxyl numbers. Depending on the viscosities and hydroxyl numbers desired, the polyether polyols produced in accordance with the invention can then be blended with otherwise nonusable polyols such as polyether polyols having very high viscosities to yield polyether polyol blends which are urethane system compatible.

Unexpectedly, it has been found that in accordance with this aspect of the invention, the presence of the alkoxyalkanol amines greatly increases the blendability of the polyether polyols produced. Thus, not only may the hydroxyl number and viscosity of an undesirable polyol be reduced by blending with polyols of the instant invention, but the blend is easily obtained with a minimum of physical mixing.

The following examples are presented for illustrative purposes only and are not meant by way of limitation.

EXAMPLE I

In this example a polyether polyol having viscosities and hydroxyl numbers which are compatible with urethane systems was produced. Initially a 15-gallon reaction kettle fitted with agitation equipment was charged with 4.0 lbs. of water and 20.2 lbs. (0.059 lb. mole) granular sucrose. An anhydrous nitrogen atmosphere was then introduced and the admixture stirred to obtain a homogeneous solution. Agitation was continued as 1.13 lbs. (0.0666 lb. mole) of ammonia was pressured into the kettle. The resulting homogeneous mixture was heated to about 40° C. with agitation and 9.0 lbs. (0.204 lb. mole) of ethylene oxide was pressured into the kettle at a rate so as to maintain the exothermic reaction mixture below 60° C. The reaction mixture was then digested at 50°–60° C. to a constant pressure.

The resulting reaction mixture was heated with agitation to temperatures of about 110° to 115° C. and 56.0 lbs. (0.965 lb. mole) propylene oxide was pressured into the kettle at a rate such that the entire amount of propylene oxide was added over a three hour period. With continued agitation, the propylene oxide was digested to a constant pressure. The excess oxides were then vented and excess water removed by vacuum stripping. The resulting reaction product mixtures was further steam stripped to remove glycols followed by vacuum stripping to remove still further water. The resultant dark red viscous liquid weighed 77.5 lbs. and analyzed as follows: hydroxyl number, 522; viscosity (25° C., Brookfield), 17,750; amine (meq/g), 0.82; and $H_2O$ (% by weight) 0.06.

EXAMPLE II

To a 15-gallon kettle fitted with a stirring device was added 30.0 lbs. (0.059 lb. mole) of 67.2% by weight sucrose solution, which was stirred at 25°–30° C. under nitrogen atmosphere while 1.13 lbs. (0.066 lb. mole) anhydrous ammonia was pressured into the kettle. The resulting homogeneous mixture was stirred and heated to 40°–45° C. while 9.0 lbs. (0.204 lb. mole) of ethylene oxide was added at a rate so as to maintain the exothermic reaction below 60° C. Then, 3.0 lbs. (0.052 lb. mole) of propylene oxide was added. The resulting mixture was finally heated to 75°–80° C. and digested for 30 minutes.

The aqueous reaction product mixture was stripped with partial vacuum down to 80 mm Hg/80° C. reducing the water concentration to 10.5%. The stripped mixture was then heated to 115° C. and 53 lbs. (0.915 lb. mole) propylene oxide was added at a constant rate over a two-hour period. After a one-hour digestion period at 115° C., the temperature was raised to 125°–130° C. and the mixture steam-stripped for two hours and finally vacuum stripped at 5 mm Hg/125° C. The product obtained was a clear, red, viscous liquid. The product analyzed as follows: hydroxyl no., 533; viscosity (25° C., Brookfield), 18,200 cps; $H_2O$ (% by weight), 0.07; color (Gardner), 10; and amine (meq/g), 0.86.

EXAMPLE III

In this example, ethylene oxide and propylene oxide were added by heteric addition in accordance with the invention. A 15-gallon reaction kettle fitted with agitation equipment was charged with 22.0 lbs. (0.0427 lb. mole) of a 67% by weight aqueous sucrose solution and stirred under a nitrogen atmosphere while 0.85 lbs. (0.050 lb. mole) of anhydrous ammonia was pressured into the kettle.

The resulting homogeneous mixture was then heated to 45°–50° C. with agitation and 10.4 lbs. (0.195 lb.

mole) of a heteric mixture containing 15 lbs. (33% by weight) ethylene oxide and 30 lbs. (67% by weight) propylene oxide was pressured into the kettle at a rate such as to maintain the exothermic reaction mixture below about 60° C. Upon completion of the addition, the agitated mixture was heated to 65°-80° C. and digested for about 30 mins. The digested solution was stripped at 80 mm Hg/80° C. to remove water. The percent by weight water remaining in the solution was about 10.2. The stripped solution was then heated with agitation to a temperature of about 110°-115° C. and 34.6 lbs., i.e. the remainder of the heteric propylene oxide-ethylene oxide admixture, was pressured into the kettle. The temperature was maintained with agitation for about 2 hours to digest the reactants.

The kettle was vented and the mixture was stripped at 5 mm Hg/110°-115° C. The resultant product consisted of 58.8 lbs. of a clear, light, reddish-brown liquid which analyzed as follows: hydroxyl number, 545; viscosity (25° C., Brookfield), 6,900; H$_2$O (% by weight), 0.10; color (Gardner), 10; and amine (meq/g), 0.90.

EXAMPLES IV—VI

These examples demonstrate that varying the water content of the reaction mixture prior to the block addition of propylene oxide produces highly desirable polyols without the necessity of steam stripping. All three examples were prepared in a substantially similar manner wherein a 15-gallon reaction kettle fitted with agitation equipment was charged with 22.0 lbs. (0.0427 lb. mole) of a 67% by weight aqueous sucrose solution and stirred under a nitrogen atmosphere at 40°-45° C. Then 0.85 lbs. (0.050 lb. mole) of ammonia was pressured into the kettle.

After the ammonia addition, 8.60 lbs. (0.195 lb. mole) of ethylene oxide was added over a 1-hour period with the exothermic reaction mixture temperature being maintained below about 57° C. The resultant reaction mixture was digested for 1 hour at about 75° C. and the kettle was vented. The reaction was then vacuum stripped at 50–100 mm Hg/75° C. to give a water content in the reaction mixture as shown in Table I below for each of the three examples.

The stripped mixture was then heated to 110° C. and 38.0 lbs. (0.655 lb. mole) of propylene oxide added over a 1½-hour period. After digesting for 2 hours, the kettle was vented. The resulting mixture was vacuum stripped at 5 mm Hg/105° C. to 110° C. The various properties of the three products obtained are shown in Table I.

TABLE I

| | 4 | 5 | 6 |
|---|---|---|---|
| Approx. H$_2$O by weight % when propylene oxide addition started | 10.0 | 8.2 | 6.8 |
| Approx. lbs. water reacted | 1.06 | 1.31 | 1.0 |
| Products | | | |
| Hydroxyl number | 517 | 525 | 530 |
| Viscosity (25° C., Brookfield) | 11,000 | 10,000 | 8,500 |
| H$_2$O (% by weight final) | 0.07 | 0.03 | 0.04 |
| Amine (meq/g) | .79 | .78 | .81 |
| Color (Gardner) | 12 | 11 | 11 |
| pH | 10.1 | 10.2 | 10.7 |

EXAMPLES VII–VIII

In these examples, the effect of adding excess ammonia in accordance with the invention is shown. Both products were prepared in a similar manner using a 5-gallon reaction kettle charged with initiator-water solutions and the process was conducted substantially as described in Examples IV—VI using reactants in quantities and under reaction conditions as shown in Table II.

TABLE II

| | 7 | 8 |
|---|---|---|
| Reactants | | |
| Initiator (tetrol) | | |
| α-methyl glucoside (lbs.) | 9.7 | |
| Pentaerythritol (lbs.) | | 6.8 |
| Water (lbs.) | 5.0 | 5.0 |
| Ammonia added at about 50° C. | .50 | .50 |
| Ratio of ammonia to initiator (by weight) | 1:19.5 | 1:13.6 |
| Ethylene oxide added at 50°-60° C. (lbs.) | 5.0 | 5.0 |
| Digestion 50°-60° C. (hrs.) | 1 | 1 |
| Vacuum stripped at 75°-80° C. (hrs.) | 3 | 3 |
| Propylene oxide at 110° (lbs.) | 22.5 | 18.5 |
| Digestion 110° C. (hrs) | 2 | 2 |
| Stripped at 5 mm Hg/110° C. (hrs) | 1 | 1 |
| Product | | |
| Hydroxyl number | 493 | 604 |
| Viscosity | 4,100 | 1,400 |
| H$_2$O (% by weight) | 0.02 | 0.10 |
| Amine (meq/g) | .74 | .93 |
| Color (Gardner) | 12 | 12 |
| pH | 10.3 | 11.5 |

EXAMPLES IX-X

In these examples, polyether polyols were prepared substantially by the method of Examples VII and VIII using a hexol and a pentol initiator, respectively. In Example IX, sorbitol was utilized as an initiator, while in Example X hydroxypropyl glucoside was used. The quantities of reactants used and the characteristics of the products obtained in each of these examples is shown in Table III.

TABLE III

| | 9 | 10 |
|---|---|---|
| Reactants | | |
| Initiator (lbs.) | | |
| 70% aqueous sorbitol (lbs.) | 13.0 | |
| 80% hydroxypropyl glucoside (lbs.) | | 9.0 |
| Anhydrous ammonia (lbs.) | 0.50 | .45 |
| Ethylene oxide at 50°-60° C. | 5.0 | 4.5 |
| Propylene oxide at 110° C. | 26.0 | 17.5 |
| Product | | |
| Hydroxyl no. | 557 | 522 |
| Viscosity (25° C., Brookfield) | 5,700 | 4,700 |
| H$_2$O (% weight final) | 0.08 | 0.05 |
| Amine (meq/g) | .66 | .93 |
| Color (Gardner) | 13 | 12 |
| pH | 10.1 | 11.9 |

Table IV shows a side by side comparison of the polyether polyols prepared with different initiators. The amount of reactants are based on a by weight ratio using the amount of ammonia as unity. Columns A, B, C, D, and E of Table IV represent the data of Examples VI, IX, X, VII, and VIII, respectively.

TABLE IV

| | A | B | C | D | E |
|---|---|---|---|---|---|
| Reactants (Ratio by weight of ammonia present) | | | | | |
| Ammonia | 1.0 | 1.0 | 1.0 | 1.0 | 1.0 |

TABLE IV-continued

|  | A | B | C | D | E |
|---|---|---|---|---|---|
| Initiator |  |  |  |  |  |
| Sucrose (octol) | 17.2 |  |  |  |  |
| Sorbitol (hexol) |  | 18.2 |  |  |  |
| Hydroxypropyl glucoside (pentol) |  |  | 16.0 |  |  |
| α-methyl glucoside (tetrol) |  |  |  | 19.5 |  |
| Pentaerythritol (tetrol) |  |  |  |  | 13.6 |
| Ethylene oxide | 10.1 | 10.0 | 10.0 | 10.0 | 10.0 |
| Propylene oxide | 45.0 | 52.0 | 39.0 | 45.0 | 37.0 |
| Analysis |  |  |  |  |  |
| Viscosity (25° C., Brookfield) | 8,500 | 5,700 | 4,700 | 4,100 | 1,400 |
| Hydroxyl no. | 530 | 557 | 522 | 493 | 604 |

EXAMPLES XI–XII

In these examples, polyol blends were prepared in accordance with the invention by physically admixing a Polyol A produced in accordance with the instant invention and a commercially available Polyol B of high viscosity. The analysis of the constituent polyols and the resulting blend is shown in Table V.

TABLE V

|  | 11 | 12 |
|---|---|---|
| Polyol A (g) | 400[1] | 250[3] |
| Hydroxyl no. | 493 | 545 |
| Viscosity (25° C., Brookfield) cps | 4,100 | 6,900 |
| Polyol B (g) | 400[2] | 150[4] |
| Hydroxyl no. | 574 | 631 |
| Viscosity (25° C., Brookfield) cps | 250,000 | 176,000 |
| Blend (g) | 800 | 400 |
| Hydroxyl no. | 539 | 580 |
| Viscosity (25° C., Brookfield) cps | 23,000 | 20,000 |

[1] Polyether polyol produced in Example VII
[2] Polyether polyol sold under the name "THANOL® R-850" by Jefferson Chemical Co., Inc., Box 53300, Houston, TX 77052
[3] Polyether polyol produced in Example III
[4] A polyol intermediate or condensate of "THANOL® R-650-X" sold by Jefferson Chemical Co., Inc. Box 53300, Houston, TX 77052.

EXAMPLES XIII–XVIII

In these examples, rigid polyurethane foams were produced from the polyether polyols produced in Examples VI, IX, X, VII, VIII, and XI. The polyurethane foams in each of these examples were produced in a substantially identical manner with amounts of reactants in parts by weight as set forth in Table VI. In each formulation 0.5 parts by weight of the reactants was a silicon oil emulsifing surfactant sold under the trade name "DC 193" by The Dow Chemical Co., Midland, Mich. 48640, 0.5 parts by weight was a triethylenediamine (TEDA)—dipropylene glycol catalyst solution containing about 33% by weight TEDA sold under the trade name "DABCO 33-LV" by Air Products and Chemical, Inc. Houdry Division, 1339 Chestnut St., Philadelphia, Pa. 19107 and 13 parts by weight was trichloromonofluoromethane used as a blowing agent. In each example the reactants were admixed and poured into molds 7"×14"×8" and allowed to foam. The cured foam was tested to determine its physical properties. The results of these tests are set forth in Table VI.

TABLE VI

|  | 13 | 14 | 15 | 16 | 17 | 18 |
|---|---|---|---|---|---|---|
| Formulation (pbw) |  |  |  |  |  |  |
| Polyol | 37.1[1] | 36.0[2] | a37.2[3] | 38.6[4] | 34.2[5] | 36.6[6] |
| Isocyanate[7] | 48.9 | 50.0 | 48.8 | 47.4 | 51.8 | 49.4 |
| Cream time, sec | 36 | 33 | 27 | 32 | 27 | 37 |
| Tack free time, sec | 117 | 130 | 90 | 120 | 90 | 135 |
| Rise time, sec | 150 | 185 | 120 | 180 | 120 | 180 |
| Physical Properties |  |  |  |  |  |  |
| Density (lbs./cu. ft.) | 2.21 | 2.04 | 2.03 | 2.06 | 1.90 | 2.10 |
| Friability (initial)[8] | None | Very slight | Yes | Yes | Slight | Very slight |
| Friability (internal)[9] | 5.75 | 8.3 | 7.5 | 1.2 | 4.6 | 17.8 |
| Heat distortion (° C.) | 182 | 181 | 152 | 155 | 149 | 181 |
| K-factor (Btu, in./sq. ft., hr., F°)[10] | 0.118 | 0.116 | 0.119 | 0.109 | 0.117 | 0.122 |
| % closed cells (based on total cells) | 93.6 | 93.0 | 94.6 | 95.4 | 92.5 | 91.4 |
| Dimensional stability[11] (% volume |  |  |  |  |  |  |

| TABLE VI-continued | | | | | | |
|---|---|---|---|---|---|---|
| | 13 | 14 | 15 | 16 | 17 | 18 |
| increase) | +4 | +1 | +4 | +6 | +3 | +6 |

[1] Polyether polyol of Example VI
[2] Polyether polyol of Example IX
[3] Polyether polyol of Example X
[4] Polyether polyol of Example VII
[5] Polyether polyol of Example VIII
[6] Polyether polyol blend of Example XI
[7] Methylene bridged polyaryl isocyanate (f ~ 2.7)
[8] Performed 10 mins. after pouring; classification: none, very slight, slight, yes, very
[9] % wt. loss after 10 mins. of tumbling
[10] Measure of heat permeability for a given thickness
[11] 100% relative humidity; 158° F.; one week

EXAMPLE XIX

This example shows the further unexpected results obtained by using the aqueous ammonia of the instant invention. In this example, triethylenediamine, which is more basic than ammonia, was used as an alkoxylation catalyst.

To a clean, dry three gallon kettle was charged 2.0 lb. of a glycerine based polyol (3 mole ethylene oxide, 7 propylene oxide) having a hydroxyl number of 288. The reactor was evacuated, purged with prepurified nitrogen and the contents heated to 100° C. Then, 17.6 g crystalline triethylenediamine (TEDA) was added to the kettle with stirring to solubilize the TEDA. A 96.4:3.6 by weight admixture of propylene oxide and ethylene oxide was then metered into the reaction mixture at 60 psig with a reactor temperature of 110° C. After about a thirty minute period, the reactor temperature was raised to about 125° C. The product was then vacuum stripped to a minimum pressure at 120° C. (2.4 lb of mixed oxide was recovered in the cold trap). The recovered product weighed 2.05 lb. and, upon analysis, showed a hydroxyl number of 277. The above example shows that, in the presence of TEDA, essentially no alkoxylation reaction occurs.

While the invention has been explained in relation to its preferred embodiment, it is to be understood that various modifications thereof will become apparent to those skilled in the art upon reading the Specification and is intended to cover such modification as fall within the scope of the appended claims.

What is claimed is:

1. In a process for producing a polyether polyol composition wherein an alkylene oxide having from about 2 to about 4 carbon atoms or mixtures thereof is intimately contacted in the presence of a catalyst with a polyhydric nonreducing initiator having from about 2 to 8 hydroxyl moieties per molecule at temperatures ranging from about 30° C. to 150° C. the improvement which consists essentially of
using as a catalyst an effective amount of an aqueous ammonia solution.

2. The method of claim 1 wherein said initiator has from 3 to 8 hydroxyl moieties per molecule and, wherein said alkylene oxide is selected from ethylene oxide, propylene oxide, and mixtures thereof.

3. The method of claim 2 wherein said ammonia solution contains from about 1:10 to 1:100 parts by weight of ammonia based on the weight of the initiator.

4. The method of claim 3 wherein said temperatures are from 40° C. to 120° C.

5. The method of claim 1 wherein said initiator is selected from a group consisting of sucrose, sorbitol, α-methyl glucoside, hydroxypropyl glucoside, pentaerythritol, trimethylolpropane and glycerine.

6. The method of claim 3 wherein ammonia is contacted with said aqueous initiator solution in amounts from about 1:10 to 1:30 parts by weight of ammonia to initiator.

7. The method of claim 6 wherein said intimate contacting is accomplished by
initially contacting from about 2 to about 12 moles of ethylene oxide with said aqueous initiator-ammonia admixture at temperatures from about 50° C. to about 65° C. to form an aqueous reaction product; and,
then contacting said aqueous reaction product with from about 8 to about 20 moles of propylene oxide at temperatures from about 105° C. to about 115° C.

8. The method of claim 7 wherein said intimate contacting is accomplished by contacting from about 12 moles to about 20 moles of a mixture consisting essentially of 33 wt. % ethylene oxide and 67 wt. % propylene oxide with said aqueous intiator-ammonia admixture at temperatures from about 50° C. to about 105° C.

* * * * *

UNITED STATES PATENT OFFICE
CERTIFICATE OF CORRECTION

PATENT NO. : 4,166,172
DATED : Aug. 28, 1979
INVENTOR(S) : HOWARD PAUL KLEIN

It is certified that error appears in the above-identified patent and that said Letters Patent are hereby corrected as shown below:

On the title page of the patent, on the fourth line of the first column, under INID Code Number [73], please change the name of the assignee from Texas Development Corporation to Texaco Development Corporation.

Signed and Sealed this

Twelfth Day of August 1980

[SEAL]

Attest:

SIDNEY A. DIAMOND

Attesting Officer

Commissioner of Patents and Trademarks